United States Patent [19]
Harris

[11] Patent Number: 5,176,240
[45] Date of Patent: Jan. 5, 1993

[54] INDEXING MACHINE WITH ROLLER CAM DRIVE

[75] Inventor: William O. Harris, East Cleveland, Ohio

[73] Assignee: Overton Corporation, East Cleveland, Ohio

[21] Appl. No.: 846,051

[22] Filed: Mar. 5, 1992

[51] Int. Cl.⁵ .................................................. B65G 15/00
[52] U.S. Cl. ............................... 198/343.1; 198/631; 198/832.1
[58] Field of Search .............. 198/343.1, 631, 832.1, 198/834

[56] References Cited

U.S. PATENT DOCUMENTS

| | | |
|---|---|---|
| 779,328 | 1/1905 | Svebilius . |
| 1,096,409 | 5/1914 | Arnott ................................ 74/348 |
| 1,177,428 | 3/1916 | Melin ................................ 123/90.2 |
| 1,577,770 | 3/1926 | Strid ................................ 74/437 |
| 1,847,312 | 3/1932 | Seufert ................................ 352/188 |
| 1,900,387 | 3/1933 | Lewis ................................ 82/1.11 |
| 2,369,540 | 2/1945 | Delamere ................................ 198/343.1 |
| 2,441,596 | 5/1948 | Reitter ................................ 74/57 |
| 2,551,080 | 5/1951 | Allen et al. ................................ 198/343.1 |
| 2,583,708 | 1/1952 | Rose ................................ 198/203 |
| 3,049,017 | 8/1962 | McDonald et al. ................................ 74/84 |
| 3,326,058 | 6/1967 | Morrison ................................ 74/393 |
| 3,678,766 | 7/1972 | Gerber ................................ 74/23 |
| 4,050,324 | 9/1977 | Teyssandier ................................ 74/397 |
| 4,635,507 | 1/1987 | Kojima ................................ 74/813 C |
| 4,881,421 | 11/1989 | Schon ................................ 74/412 TA |
| 4,955,243 | 9/1990 | Kato et al. ................................ 74/84 R |
| 5,096,041 | 3/1992 | Ravenhorst ................................ 198/343.1 |

FOREIGN PATENT DOCUMENTS 591065 8/1947 United Kingdom .

*Primary Examiner*—Joseph E. Valenza
*Attorney, Agent, or Firm*—Thomas Hooker

[57] ABSTRACT

An indexing machine includes a continuous chain having a run extending between a pair of movable sprocket gears. Work carriers are provided at spaced intervals along the chain and a plurality of fixed work stations are located at equal intervals along the chain run. The machine includes a drive for continuously moving the chain including a compound worm gear with a lead and a variable pitch diameter. The gear engages followers attached to a sprocket gear so that rotation of the gear simultaneously translates the chain and rotates the sprocket gear to move the work carriers past the work stations and dwell the carriers at the stations.

19 Claims, 3 Drawing Sheets

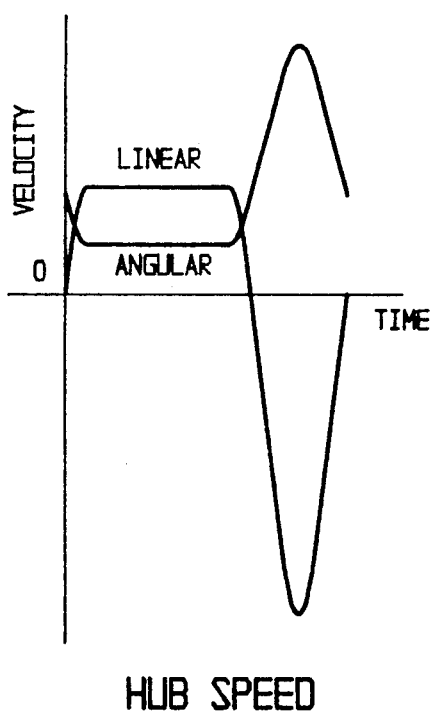
Fig. 5 HUB SPEED
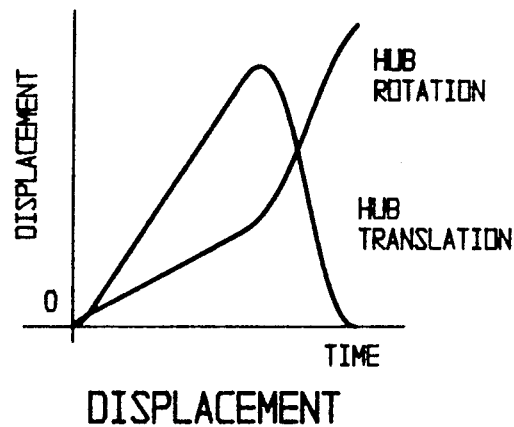
Fig. 6 DISPLACEMENT
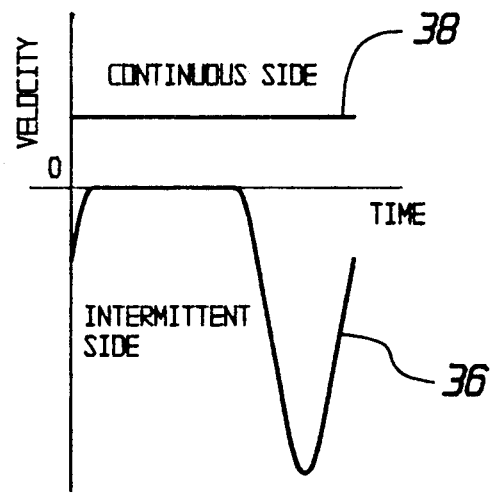
Fig. 7 CHAIN SPEED

INDEXING MACHINE WITH ROLLER CAM DRIVE

FIELD OF THE INVENTION

The invention relates to indexing machines with continuous rotary input for moving a plurality of work carriers on a chain rapidly between work stations and dwelling the carriers at the stations.

DESCRIPTION OF THE PRIOR ART

Power indexing machines using a chain with work carriers spaced along the chain and a rotary drive to index the chain on a work path between work stations and then slow the chain and carriers at work stations are known in the art. These machines permit indexing of work parts between stations and loading an unloading of parts while flowed at the stations.

SUMMARY OF THE INVENTION

The disclosed indexing machine includes a pair of spaced sprocket gears which are mounted on opposite ends of a slide bar. A chain is wrapped around the gears. A compound worm gear having a variable lead and a variable pitch diameter is rotated at a continuous speed to simultaneously rotate one of the sprocket gears corresponding to the variable lead and index both sprocket gears, the slide bar and the chain back and forth through a cycle of operation with each rotation of the worm gear. The compound movement of the chain due to rotation of the sprocket gear and the translation of the chain dwells one run extending between the sprocket gears so that the carriers on the chain are motionless for a long period of time at locations opposite work stations. The dwell period may be one-half or 180 degrees or more of the rotation of the worm gear. During dwell, work parts may be placed on the work carriers, removed from the work carriers and work operations may be performed on the work at the stations. During the remaining portion of each rotation of the worm gear the chain is rapidly but smoothly accelerated and decelerated to move the work carriers to the next downstream work station. In this way, work parts are very rapidly moved between stations and dwelled at the stations for relatively long periods.

Other objects and features of the invention will become apparent as the description proceeds, especially when taken in conjunction with the accompanying drawings illustrating the invention, of which there are three sheets and one embodiment.

DESCRIPTION OF THE DRAWINGS

FIGS. 5, 6 and 7 are graphs illustrating the parameters of operation of the indexing machine.

DESCRIPTION OF THE PREFERRED EMBODIMENT

Figure 3:
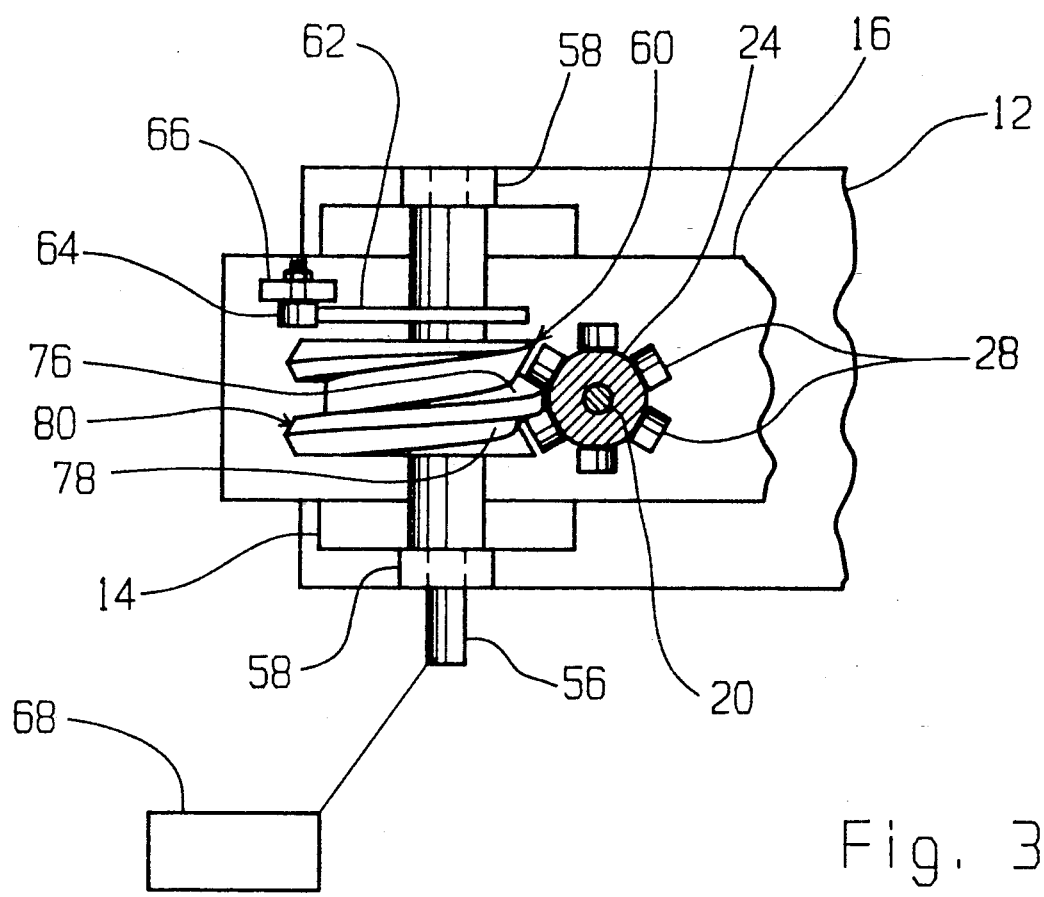
FIG. 3 is a top view, partially broken away, of the roller cam drive used in indexing machine.

Indexing machine 10, includes a fixed base plate 12, a block 14 mounted on plate 12 with an elongate slide bar fitted within a slot 18 in the block 14. The slide bar is longitudinally movable back and forth along the slot. A pair of vertical shafts 20 and 22 are mounted on the bar 16 at spaced locations. Hub 24 is mounted on shaft 20 and carries a sprocket gear 26 at the top of the shaft and six 60-degree spaced rotary cam followers 28 spaced around the circumference of the shaft as shown in FIG. 3. Hub 30 is mounted on the top of shaft 22 and supports a sprocket gear 32 like gear 26.

Continuous chain 34 is wrapped around gears 26 and 32 and includes an intermittent movement run 36 located to one side of the sprocket gears and a continuous movement run 38 located on the other side of the sprocket gears. A plurality of work carriers 40 are regularly spaced along the length of the chain 34.

Work stations 42, 44, 46 and 48 are located on base 12 along the intermittent movement run 36 of chain 34. The spacing between these stations is equal to the spacing between adjacent work carriers on the chain 34. Work stations 50 and 52 are located adjacent the continuous movement chain run 38.

A rotary cam drive 54 is mounted on base 12 adjacent to shaft 20. The drive includes a camshaft 56 journaled in the upper ends of a pair of support arms 58 mounted on opposite sides of base 12. The shaft supports a compound worm gear 60 engagable with cam followers 28 on shaft 20. A plate cam 62 is also mounted on shaft 56 and has a variable pitch diameter that at any time complements the variable pitch diameter of gear 60. Roller cam follower 64 mounted on a support 66 on plate 16 is located on the side of the cam shaft 56 away from shaft 20. As shown in FIG. 3, follower 64 engages the plate cam 62 to maintain engagement between the gear 60 and followers 28 during rotation of the gear. In this way, a positive drive engagement is continuously maintained between the worm gear 60 and followers 28 on hub 24.

A continuous rotary drive 68 rotates shaft 56 at a fixed rate to actuate the machine 10 for intermittent acceleration, deceleration and then dwell of chain run 36 to move and then dwell carriers 40 along the continuous movement chain run 38.

Figure 1:
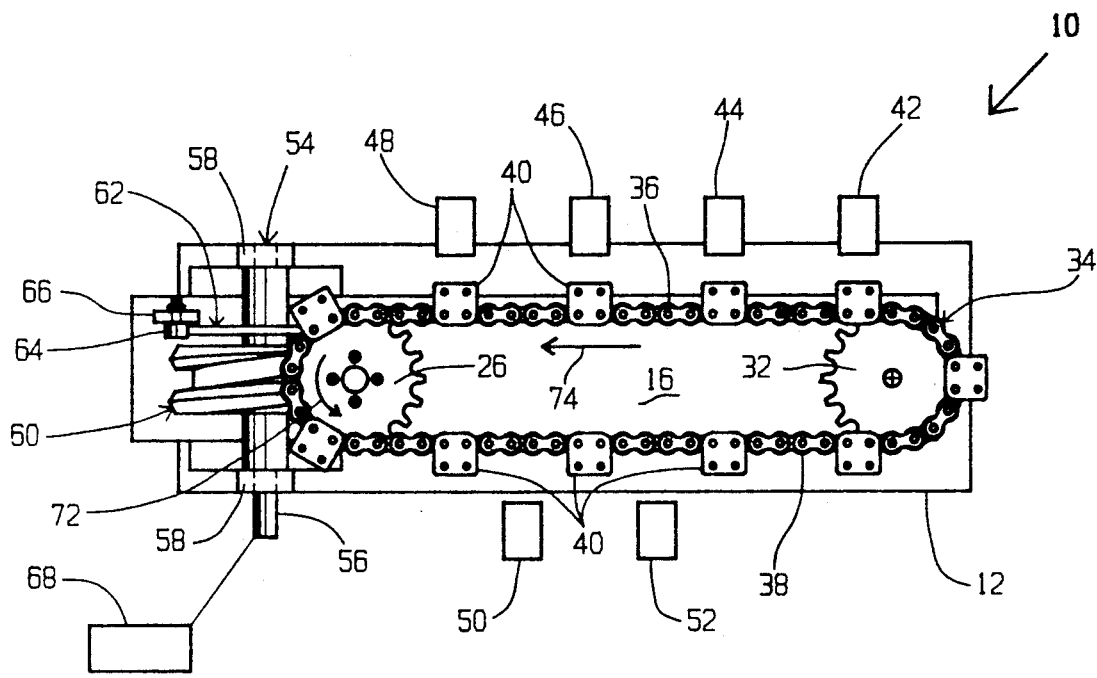
FIG. 1 is a top view of an indexing machine according to the invention.
Figure 2:
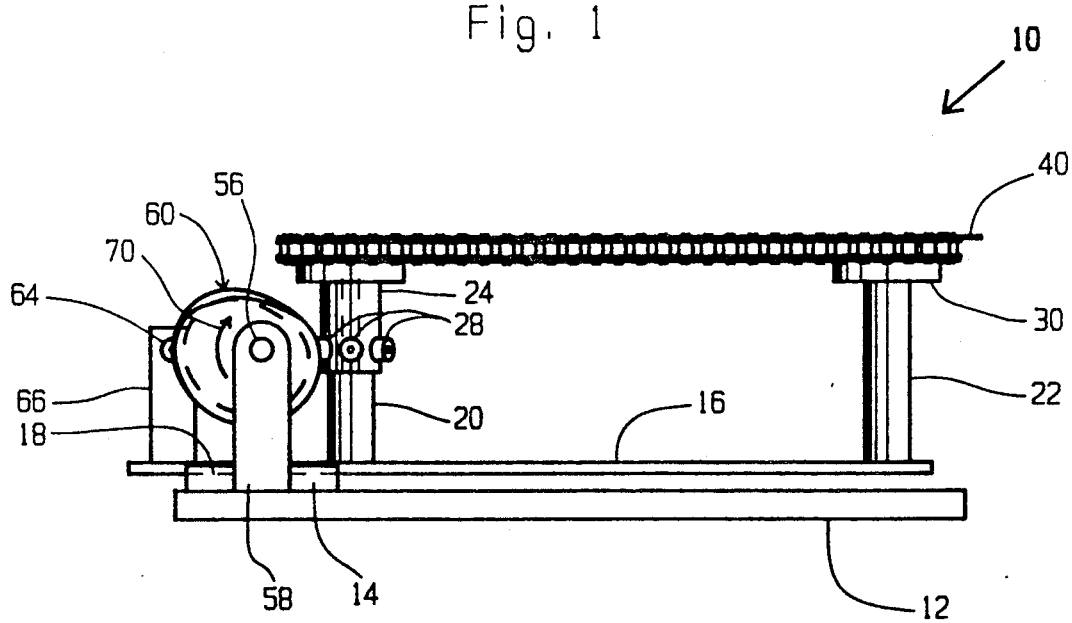
FIG. 2 is a side view of the machine as shown in FIG. 1.

As shown in FIGS. 1 and 2, drive 68 rotates shaft 56, gear 60 and cam 62 in the direction of arrow 70 to rotate sprocket gear 26 in the direction of arrow 72 at a varying rate depending upon variable lead of the worm gear and at the same time translate the slide bar 16 back and forth in slot 18 relative to the base 12. The combination rotation and translation imparted by the continuous rotation of worm gear 60 imparts intermittent feed and dwelled movement to run 36 in the direction of arrow 74 relative to the base and work stations 42, 44, 46 and 48 and continuous movement of run 38 in the opposite direction.

The indexing machine is used to move work parts placed on work carriers 40 on chain 34 during manufacturing operations. The operation of the machine 10 will now be described.

Drive 68 rotates shaft 56, worm gear 60 and plate cam 62 in the direction of arrow 70 at a continuous rate. Rotation of the worm gear rotates the worm 80 and moves the side surfaces 76 and 78 to engage the followers 28 from the side of the gear adjacent plate cam 62 to the side of the gear away from the plate cam. Engagement of the plate cam and fixed follower 64 maintains the sides 76 and 78 of the worm in engagement at all times with at least two of the rotary cam followers 28 on hub 24 despite the varying pitch of worm 80. In this manner, the continuous rotation of the worm gear simultaneously rotates hub 24 and sprocket gear 26 about shaft 20 in the direction of arrow 72 at a angular rate proportional to the variable lead of worm 80.

Figure 4:
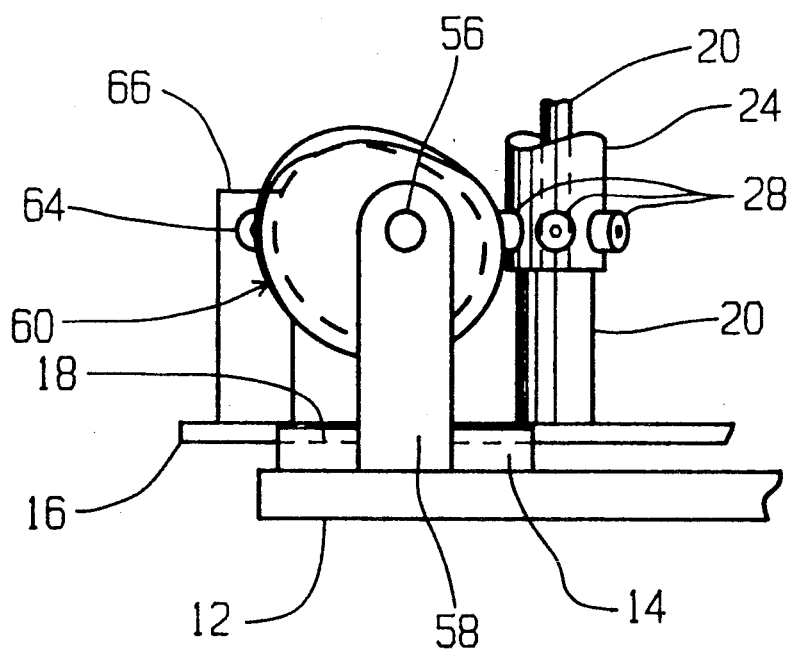
FIG. 4 is a side view of the drive of FIG. 3.

As shown best in FIGS. 2 and 4, the pitch diameter of the worm gear varies with regard to the angular position of the gear on the shaft 56. The change in the pitch diameter of the worm gear at the point of contact with rotary followers 28 varies the distance between the axis of shaft 58 and the vertical axis of shaft 20 during each rotation of the gear so that the slide bar 16, sprockets 26 and chain 36 is moved away from and then back toward the axis of shaft 56. The graphs of FIGS. 5, 6 and 7 describe the compound movements imparted to the two chain runs 36 and 38 due to rotation of sprocket gear 26 by the worm gear and due to back and forth translation of the two sprocket gears by the worm gear.

During each 360 degree rotation of worm gear 60 the worm 80 rotates the sprocket gear 26 one-third of a rotation or 120 degrees, a rotary distance equal to the spacing between adjacent work carriers on chain 34 when wrapped around the gear as shown in FIG. 1. Each 360-degree rotation of worm gear 60 translates bar 16 and the chain runs 36 and 38 back and forth. Run 36 moves forward in the direction of arrow 74 at the same time the rotation of the gear 60 rotates sprocket gear 26 in the direction of arrow 72. The difference between the maximum and minimum pitch diameters of the gear is somewhat greater than one-half the spacing between adjacent carriers on the chain.

FIGS. 1 through 4 show the position of machine 10 corresponding to the initial left hand positions of the graphs of FIGS. 5–7. During the initial clockwise rotation of worm gear 60 the pitch diameter of the side surfaces 76 and 78 engaging cam followers 28 increases to move the slide bar 16, sprockets 26 and 32 and runs 36 and 38 away from shaft 56. FIG. 5 illustrates that the linear movement of the run 36 accelerates from zero velocity rapidly to a fixed linear velocity which is maintained for 180 degrees or one-half of the rotation of the worm gear. Accordingly, during one-half of the rotation of the worm gear the run 36 is moved in a direction opposite to the direction of arrow 34 at a constant rate because of the increasing pitch diameter of gear 60.

During the same period of rotation of worm gear 60, the side surfaces 76 and 78 engage the cam rollers 28 and rotate the sprocket 26 in the direction of arrow 72. The angular velocity of the sprocket gear is indicated on FIG. 5. After the initial decrease, the angular velocity remains constant for the same 180 degrees or one-half rotation of the worm gear during which the linear velocity is constant. As a result, rotation of the sprocket gear 26 moves the intermittent chain run 36 in the direction of arrow 74 at exactly the same rate as the run is being moved in the opposite direction by the varying pitch diameter of the worm gear. These equal and opposite motions of the intermittent run 36 cancel each other during half of the period of rotation. For half of each rotation of the worm gear the intermittent run is dwelled in the position shown in FIG. 1 with a work carrier 40 located adjacent each work station 42, 44, 46 and 48. The long dwell period permits work parts to be loaded onto the work carriers, removed from the work carriers and work operations to be performed at the work stations.

After the end of the 180 degree dwell period the cam followers 28 engage a portion of worm gear 60 having a maximum pitch diameter so that the slide bar 16 and sprockets 26 and 32 have moved to a maximum position to the right as viewed in FIGS. 1 and 2. Continued rotation of shaft 56 and worm gear 60 reverse the linear movement of the sprocket gears as shown in FIG. 5. At the same time, the angular velocity of gear 26 is increased and then decreased as shown in FIG. 5. The result of these movements is that the intermittent movement run 36 of chain 34 is rapidly moved in the direction of arrow 74 by both the linear movement of the sprocket gear 26 and the angular movement of gear 26 during the remainder of the one-half 360 degree rotation of gear 26. This movement rapidly accelerates and then decelerates the run 36 as it moves in the direction of arrow 74 to move the work carriers 40 to adjacent downstream work stations where the stations are then dwelled during one-half of the next revolution of gear 60.

FIG. 6 is a graph indicating the displacement of the hub due to translation and rotation during one 360 degree rotation of gear 60.

FIG. 7 shows graphs indicating the velocity of the two chain runs 36 and 38 during one rotation of the worm gear. As previously described, intermittent movement run 36 is dwelled during approximately 50 percent or 180 degrees of rotation of the gear and is then rapidly accelerated as indicated. The continuous motion run 38 moves from gear 26 to gear 32 at a constant velocity during rotation of the gear so that work on carriers 30 is moved past stations 50 and 52 and is not dwelled at the station.

A compound worm gear 60 performs two functions. The lead of worm 80 rotates the sprocket gear 26 to move the chain in the direction of arrow 72 according to the lead of worm 80 while the variable pitch diameter of the gear moves the chain 34 back and forth as shown on the Hub Translation graph of FIG. 6 at a velocity as shown in the Linear graph of FIG. 5. Plate cam 62 has a pitch diameter that at any time complements the pitch diameter of worm gear 60 and assures that the worm gear is maintained in constant contact with at least two of the cam followers 28 on hub 24 at all times. In some applications, the feed of worm 80 may be constant to rotate gear 26 at a constant velocity as opposed to the varied velocity shown in FIG. 6. In such case, the pitch diameter of the worm gear 60 is varied to assure that during one-half or 180-degrees of each full rotation of the gear 60 the two sprocket gears 26 and 32 and intermittent motion chain run 36 are moved in a direction opposite to the direction of arrow 74 at a rate sufficient to cancel the movement of the run in the direction of arrow 74 by rotation of gear 26. Additionally, it is not necessary that the linear and angular hub speeds shown in FIG. 5 be constant during the dwell period. These speeds may vary, as long as they are in opposite directions and offset each other. In this way, the machine may be operated rapidly and smoothly with decreased inertial forces due to rapid accelerations and decelerations at the beginning and end of the dwell period.

While the lead and pitch diameter of worm gear 60 is shaped to produce the motion shown in FIGS. 5, 6 and 7, where the intermittent feed run 36 is dwelled for approximately one-half of each rotation of the worm gear, the lead and pitch diameter of the worm gear may be varied in order to vary the duration of the dwell period and the acceleration and deceleration for the intermittent chain run 36 in accordance with the requirement of a particular application. For instance, in some applications in which very heavy work parts are placed on carriers 40, it may be necessary to reduce the dwell period and thereby provide a greater part of each rotation of the gear 60 for indexing the chain between stations so that inertial forces during acceleration and deceleration are reduced.

Indexing machine 10 may be used in manufacturing operations where repetitive steps need to be rapidly performed on a series of work parts. For instance, indexing machine 10 may be used to fill and seal containers. Successive containers are positioned on work carriers 40 when dwelled at loading station 44. These carriers are then rapidly moved downstream and dwelled at station 46 where the containers are filled during dwell. Subsequent movement of the containers to and dwell at work station 48 permits placing a heat shrink closure on the filled containers. The containers are then fed around gear 26 and past fixed stations 50 and 52 where the closures are heated and shrunk-fitted onto the containers to form a permanent seal. Continued indexing of the chain in the direction of arrow 74 moves the containers to discharge station 42 where the filled and containers are removed from carriers 40.

The use of the indexing machine for filling and sealing containers is illustrative of a number of high speed manufacturing operations and is included by way of example only. If desired, the spacing between sprockets 26 and 32 may be increased to provide longer runs 36 and 38 with additional work stations spaced along the runs.

The disclosed chain and sprocket gears could be replaced by belts, strands, other types of continuous indexing members or by pulley, cylinders and the like. Accordingly, the term "chain" includes belts and other types of continuing indexing members and the term "gear" encompasses other types of members engagable by chains or gears.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. An indexing machine comprising a base, a member movably mounted on the base, a pair of sprocket gears mounted at spaced locations on the member for rotation around sprocket gear axes, a continuous chain wrapped around the sprocket gears to define a chain run extending between the sprocket gears, a plurality of work carriers mounted on the chain at regular intervals along the length of the chain, a plurality of work stations on the base adjacent the chain run, the work stations being spaced apart at the same intervals the work carriers are spaced apart on the chain, follower means attached to one of said sprocket gears for rotating the sprocket gear, a shaft rotatably mounted on the base adjacent said one sprocket gear and having an axis, a drive gear mounted on the shaft including drive means engagable with the follower means for rotation of said one sprocket gear in response to rotation of the drive gear, said drive gear having a variable pitch diameter with a minimum pitch diameter low point and a maximum pitch diameter high point, and a power drive for rotating the shaft to simultaneously rotate such one sprocket gear and translate the member, sprocket gears and chain.

2. An indexing machine as in claim 1 wherein the axis of the shaft extends transversely to the axis of the one sprocket gear.

3. An indexing machine as in claim 2 wherein one rotation of the shaft rotates the one sprocket gear sufficiently to advance the chain a distance equal to the distance between adjacent work carriers.

4. An indexing machine as in claim 3 wherein the difference between the maximum pitch diameter of the drive gear and the minimum pitch diameter of the drive gear equals approximately one-half of the distance between adjacent work carriers.

5. An indexing machine as in claim 3 wherein the drive means comprises a worm.

6. An indexing machine as in claim 5 wherein the lead of the worm is non-linear.

7. An indexing machine as in claim 3 wherein the lead of the drive means is non-linear.

8. An indexing machine as in claim 1 including engagement means for maintaining contact between the drive gear and the follower means during 360-degree rotation of the gear.

9. An indexing machine as in claim 8 wherein said engagement means includes a rotary cam on the shaft and a follower on the member engagable with the rotary cam to prevent separation of the drive gear from the follower means.

10. An indexing machine as in claim 1 wherein the chain includes a second run extending between the sprocket gears and including an additional work station on the base adjacent the second chain run.

11. An indexing machine as in claim 1 wherein the follower means comprises a plurality of follower members spaced at regular intervals around the circumference of the axis of said one sprocket gear.

12. An indexing machine as in claim 11 wherein each follower member comprises a rotary cam follower.

13. An indexing machine comprising a base, an elongate member slidably mounted in the base for reciprocal movement therealong, a pair of sprocket gears rotatably mounted on the members for rotation around sprocket gear axes, a continuous chain wrapped around the sprocket gears to define a chain run extending between the sprocket gears, a plurality of work carriers mounted on the chain at regular intervals along the chain, a plurality of work stations on the base adjacent the chain run, the work stations being spaced apart on the chain, a plurality of followers attached to one of the sprocket gears at regular circumferential intervals around the axis of such sprocket gear for rotating the sprocket gear, a drive shaft rotatably mounted on the base adjacent said one sprocket gear and having an axis extending transversely to the direction of movement of the member along the, a drive gear mounted on the shaft including a worm engagable with the followers for rotation of said one sprocket gear in response to rotation of the worm gear, said drive gear having a variable pitch diameter with a minimum pitch diameter low point and a maximum pitch diameter high point, and a power drive for rotating the shaft to simultaneously rotate such one sprocket gear and translate the member, sprocket gears and chain back and forth along the base.

14. An indexing machine as in claim 13 wherein one rotation of the drive shaft rotates the one sprocket gear sufficiently to advance the chain a distance equal to the distance between adjacent work carriers.

15. An indexing machine as in claim 14 wherein the lead of the worm is non-linear.

16. An indexing machine as in claim 14 wherein the difference between the maximum pitch diameter of the drive gear and the minimum pitch diameter of the drive gear equals approximately one-half the distance between the adjacent work carriers on the chain.

17. An indexing machine as in claim 16 wherein the lead of the worm is non-linear.

18. An indexing machine as in claim 14 including engagement means for maintaining contact between the drive gear and the followers during 360 degree rotation of the drive gear.

19. An indexing machine as in claim 18 wherein each follower comprises a rotary cam follower and at least two followers engage the worm at all times.

* * * * *

UNITED STATES PATENT AND TRADEMARK OFFICE
CERTIFICATE OF CORRECTION

PATENT NO. : 5,176,240
DATED : January 5, 1993
INVENTOR(S) : William O. Harris

It is certified that error appears in the above—identified patent and that said Letters Patent is hereby corrected as shown below:

Column 1, line 58, before indexing, insert --the--.

Column 3, line 2, change "a" to --an--.

Column 5, line 20, delete "and".

Column 6, line 38, change "members" to --member--.

Column 6, line 51, after "the" (first occurrence), insert --base--.

Signed and Sealed this

Second Day of November, 1993

Attest:

BRUCE LEHMAN

Attesting Officer

Commissioner of Patents and Trademarks